D. DUNBAR.
FILTERING OF WATER AND OTHER LIQUIDS OR THE LIKE.
APPLICATION FILED AUG. 19, 1914.

1,253,674.

Patented Jan. 15, 1918.
6 SHEETS—SHEET 4.

FIG. 5.

D. DUNBAR.
FILTERING OF WATER AND OTHER LIQUIDS OR THE LIKE.
APPLICATION FILED AUG. 19, 1914.

1,253,674.

Patented Jan. 15, 1918.
6 SHEETS—SHEET 5.

Witnesses-

Inventor-
David Dunbar
by his Attorneys

D. DUNBAR.
FILTERING OF WATER AND OTHER LIQUIDS OR THE LIKE.
APPLICATION FILED AUG. 19, 1914.

1,253,674.

Patented Jan. 15, 1918.
6 SHEETS—SHEET 6.

UNITED STATES PATENT OFFICE.

DAVID DUNBAR, OF GLASGOW, SCOTLAND.

FILTERING OF WATER AND OTHER LIQUIDS OR THE LIKE.

1,253,674.

Specification of Letters Patent.

Patented Jan. 15, 1918.

Application filed August 19, 1914. Serial No. 857,594.

*To all whom it may concern:*

Be it known that I, DAVID DUNBAR, a subject of the King of Great Britain and Ireland, and a resident of Glasgow, Scotland, county sanitary inspector, have invented new and useful Improvements in the Filtering of Water and other Liquids or the like, of which the following is a specification.

This invention has reference to a new or improved system and arrangement and combination of appliances for filtering water and other liquids or the like and is particularly applicable to towns or places where a gravitation supply of water is available for domestic purposes, and by the use of which filtration of the water from animalcula or suspended matter is effected in a more simple, economical and efficient manner than heretofore.

According to the improvements of this invention perforated or openwork filter screens are arranged in parallel rows within housing frames and when these filter screens get clogged up with animalcula or other deposits they are cleansed or washed without removing them by means of portable appliances.

In some cases, for instance, when a supply of water for a town is to be filtered, series of screens are preferably arranged in sets each of which may be isolated from the other set so that the portable appliances for washing them may after washing the screens of one set be moved over another set to wash the screens of same.

In order that others skilled in the art to which my invention relates may properly understand same I have hereunto appended six sheets of explanatory drawings in which

In Figs. 3 to 5 the upper portion of the building (shown in section in Figs. 1 and 2), and which contains the filtering appliances, is shown broken away. Fig. 6 is a sectional elevation (broken away) of one of the filtering screens, while Figs. 7 and 8 are respectively a sectional elevation and a plan view of one of the spray or sparge boxes hereinafter referred to and Fig. 9 is a sectional elevation of a portion of the rose of the spray box illustrating the shape of the perforations and hereinafter referred to.

Referring to these drawings:—

In carrying these improvements into use I arrange within suitable housing frames a series of rows or sets of filters set parallel.

Figure 6:
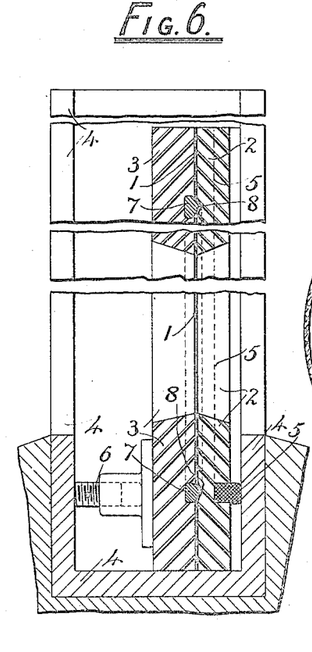

As illustrated in detail by Fig. 6 these filters consist of screens 1 of finely meshed woven wire or wire cloth or like material of any desired thickness or mesh.

The screen 1 is preferably arranged or sandwiched between two rectangular or other open sash frames 2 and 3 fitted into an open rectangular channel frame 4. A rubber or like resilient strip 5 is fitted into the frame 2 and bears against the frame 4 while any suitable number of screw blocks 6 are arranged between the frames 3 and 4, so that the screen 1 and frames 2 and 3 are tightly secured into the frame 4 while a strip 7 of wood or other suitable material is fitted into the frame 3 and having a pointed face 8 which enters a groove in the adjacent face of the frame 2 securely holds the screen 1 in position.

The frames 4 are arranged parallel with each other in series between walls 9 and are adapted to slide in grooves formed in the walls so as to be easily removable for inspection or repair. Any suitable number of frames 4 each having a screen 1 may be arranged in each series for example, as shown in Figs. 1 to 5, five frames are in each series and these series of frames may be arranged in any suitable number of sets, for example, two sets A and B each of three series are shown in Figs. 1 to 5.

If desired, the walls 9 which separate each series from its neighbor in the same set may be dispensed with and the grooves within which the frames 4 slide formed in stanchions. This is not illustrated as its construction will be readily understood.

Figure 5:
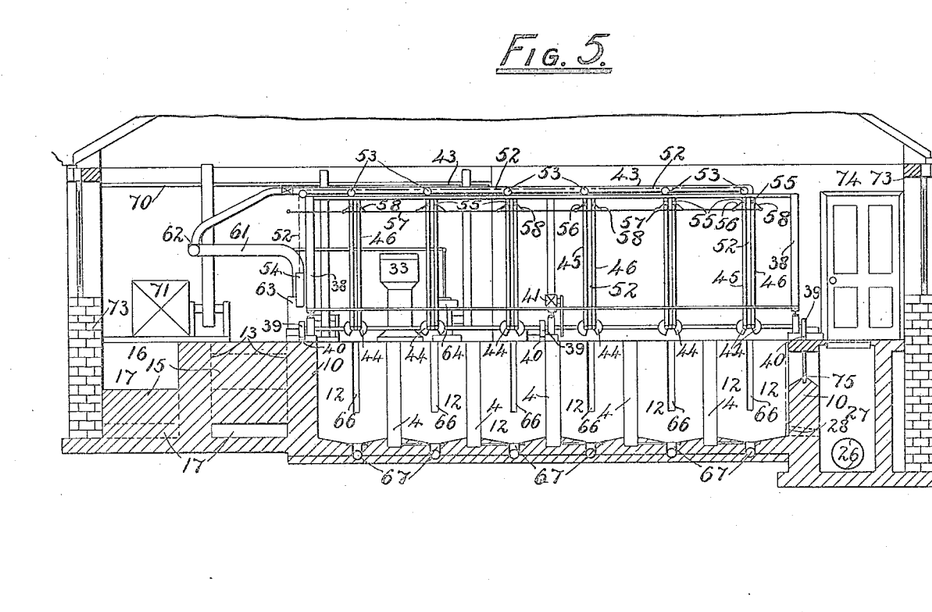
Fig. 5 is a sectional elevation taken on the line 5—5 of Fig. 1.

The filtering chamber which is formed by the side and end walls 10 and 11 is divided into compartments 12 by the walls 9 and as shown in Fig. 5 the floors of the compartments are preferably double inclined or V shaped.

A chamber 13 divided into compartments 14 by baffle walls 15 is constructed alongside the filtering chamber and a similar chamber 16 is constructed alongside the chamber 13. Each compartment 14 of the chambers 13 and 16 communicates with its neighbor by openings 17 formed at the lower and upper ends alternately in the walls 15. Openings fitted with penstock or other suitable valves 18 and 19 are formed in the side wall 10 dividing the filtering chamber from the chamber 13 and an opening fitted with a similar valve 20 is formed in the dividing wall 21 of the chambers 13 and 16 while an emergency pipe 22 fitted with a similar valve 23 connects the chamber 16 with the filtering chamber.

Openings 24, preferably knife edged, (Figs. 1 to 4) are formed in the walls 9 of the filtering chamber so as to put the compartments 12 into communication with each other. The opening 24 in the center wall 9 dividing the one set of filters from the other is arranged at a higher level than the openings in the other walls.

The gravitation water supply enters by the pipe 25 into the chamber 16 at one end and passes to the other end over and under the baffle walls 15. The valve 23 being closed and the valve 20 open, the water enters the chamber 13. The valve 18 being open and the valve 19 closed, the water enters the first row of compartments 12 of the set A of filters. The water is now filtered by passing through the screens 1 to the other side of filtering chamber and the clean water is discharged through openings 75 preferably knife edged into the passage or pipe 26 preferably formed with chambers 27 having hand flushing valves 28 and is led from the pipe 26 by other pipes connected thereto and used in the town or other place as may be arranged.

When the screens 1 of the set A become clogged the water in front of same rises until it overflows through the opening 24 of the dividing wall 9 into the compartments 12 of the set B and passes through the screens of that set to the pipe 26. An opening 29 formed in the end wall 11 of the set A leads into a float chamber 30 in which a float 31 is arranged at the one end of a pivoted lever 32, the other end of which is connected to and actuates an alarm recording device 33 of suitable construction and an audible alarm 34 when the rising water raises the float 31.

A similar opening 29, float chamber 30, float 31, recording device 33 and alarm 34 are arranged for the set B so that as soon as the water in either set A or in set B rises beyond a predetermined point the float will be raised and the alarm sounded so as to call the attention of the person in charge to the state of affairs.

The recording device will indicate how long the person in charge takes to remedy the state of matters which exist when the water is rising in front of the screens.

When it is desired to clean out the compartments and screens of the set A the valve 19 is opened and the valve 18 closed so that the filters of the set B are used, and similarly the filters of the set A are used when those of set B are being cleaned.

When it is desired to clean out, inspect or repair the chamber 16 the valves 20 and 23 are closed and a valve 35 in a branch pipe 36 from the inlet pipe 25 to the chamber 13 opened and a valve 37 in the pipe 25 closed. The water now enters from the pipe 25 through the pipe 36 to the chamber 13 and from thence either through the opening fitted with the valve 18 or through the opening fitted with the valve 19 to the set of filters A or B as may be desired.

When the chamber 13 is to be inspected, repaired or cleaned out, the valves 18, 19, 20 and 35 are closed and the valves 37 and 23 opened so that the water from the pipe 25 passes through the chamber 16 and pipe 22 to the set B.

Figure 7:
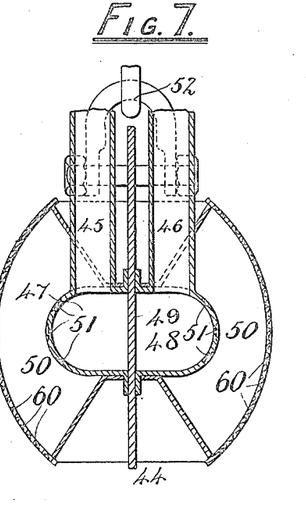
Figures 8, 9:
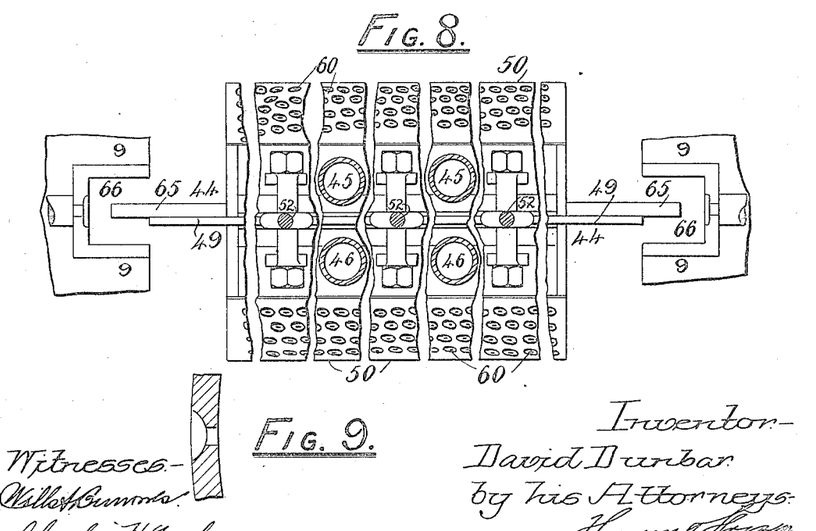

A carriage or traveling frame 38 of suitable construction is mounted on wheels 39 adapted to run on rails 40 arranged over the filter chamber. This carriage is preferably fitted with a motor or the like 41 which drives one of the shafts of the traveling wheels 39. Two pipes 43 arranged on the top of the carriage 38 are connected to each of a series of spray or sparge boxes 44 by preferably two flexible pipes 45 and 46. The spray boxes consist of a tube or chamber (Figs. 7 and 8) divided into two compartments 47 and 48 by a central division plate 49.

Each of these compartments communicate with the interior of the rose 50 of the spray by orifices or perforations 51 arranged in a suitable manner. The one end of each flexible pipe 45 is fitted to one of the pipes 43 while the other end of the pipe is connected to the compartment 47 and the one end of each pipe 46 is also connected to the same pipe 43 while the other end of the pipe 46 is connected to the compartment 48. The other pipe 43 is similarly connected to the compartments 47 and 48 by flexible pipes 45 and 46.

As many pipes 43 as desired may be arranged on the carriage 38 and each pipe 43 is connected to the compartments 47 and 48 by flexible pipes 45 and 46.

A spray or sparge box 44 is arranged between each screen 1 and its neighbor and also between the end screen 1 of the set and the wall, so that when five screens are arranged in each series there are preferably six spray boxes each divided into two compartments as before described.

Figure 1:
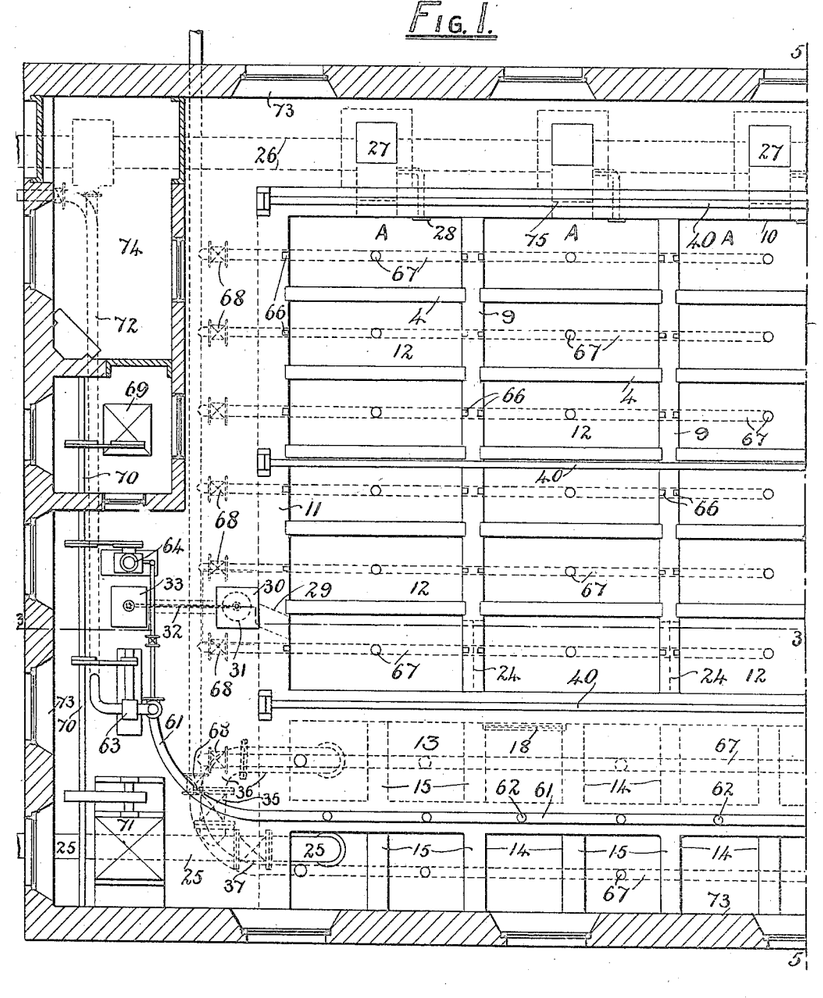
Figure 1 is a plan view of the left hand portion and Fig. 2 is a similar view of the right hand portion of an arrangement or system of filtering appliances according to the improvements of this invention.
Figure 2:
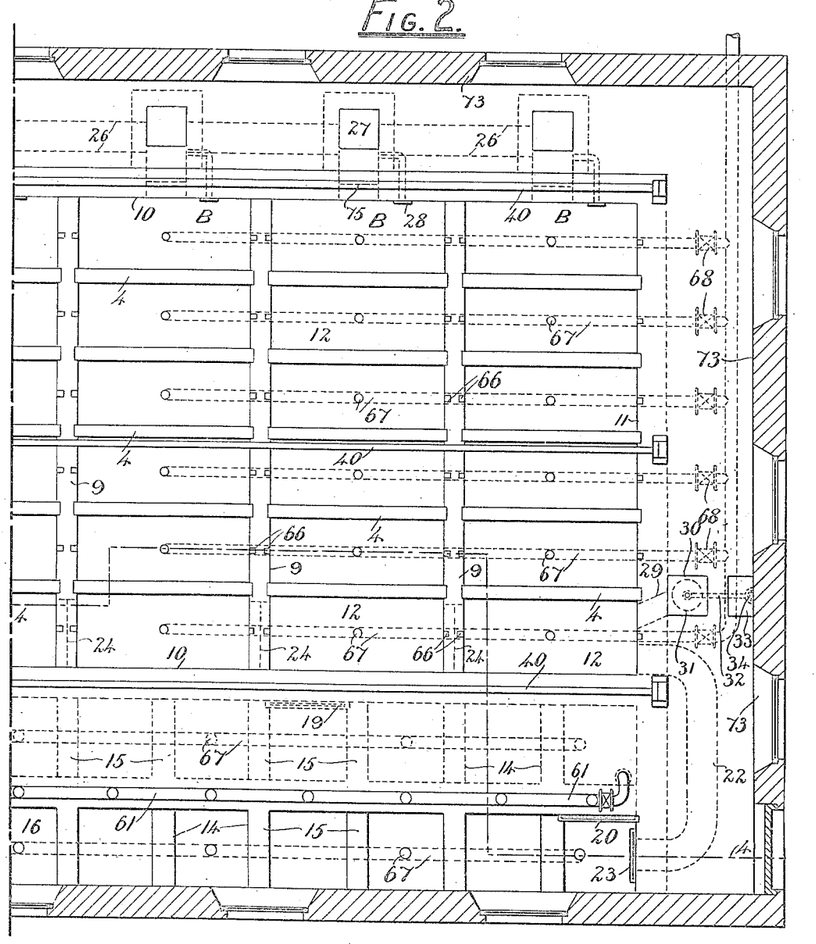
Figure 3:
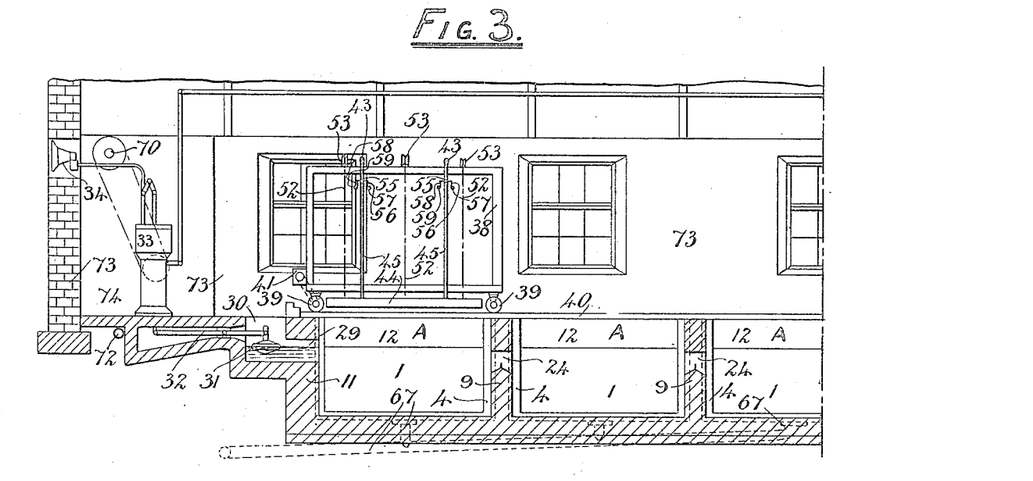
Fig. 3 is a sectional elevation taken on the line 3—3 of Fig. 1
Figure 4:
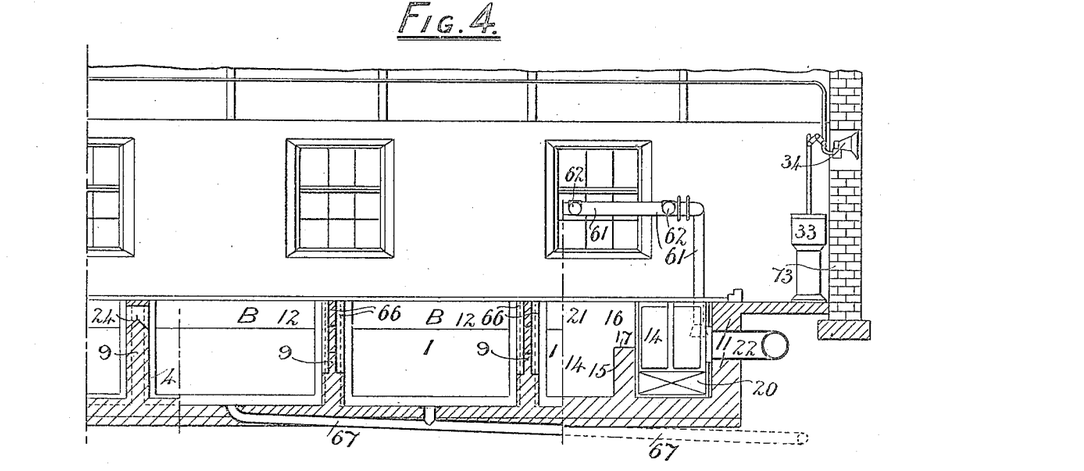
Fig. 4 is a similar view taken on the line 4—4 of Fig. 2.

The spray or sparge boxes 44 are suspended from the carriage 38 by wire or like ropes 52 which pass over pulleys 53 carried in suitable bearings on the top framework of the carriage 38 and which are either connected to a counter balance weight 54 or are operated by other suitable means. The weight 54 is such that when the sparge boxes 44 are empty they are raised up clear of the filter chamber as shown by Figs. 3 and 5, but when the sparge boxes are filled with water (as hereinafter described) then the weight of the boxes 44 plus the weight of the water in same, overcomes the weights 54 and the boxes are lowered into position between the screens. The pipes 45 and 46 are each fitted with a valve or cock 55 and the valves 55 on the pipes 45 connected to the same pipe 43 are all connected by lever arms 56 to a rod 57 and similarly the valves 55 on the pipes 46 are connected together by lever arms 58 to a rod 59.

As shown in the detail view (Fig. 9) the perforations 60 of the rose 50 of the sparge boxes are preferably dished or countersunk and they are so arranged that water or air issuing from them will impinge against and clean the whole surface of the screen they are directed against.

Under normal conditions when the water is passing through the screens the sparge boxes are up clear of the filter chamber, as shown by Fig. 3, but when the screens become clogged and it is desired to clean them the water supply to that set of screens is cut off and the compartments emptied.

The carriage is arranged over the first series of screens and the ends of the pipes 43 are connected by flexible pipes and suitable couplings to the supply pipe 61 which is fitted with a valve 62 for each connection. This supply pipe 61 is fed by a pump 63 with clean water preferably mixed with compressed air from a suitable air compressor 64. The valves 62 for the two connections are opened so that the pipes 43 are charged with pressure water from the pump 63 and compressor and first the valves 55 of the pipes 45 are opened and the valves 55 of the pipes 46 closed so as to charge the compartments 47 on one side of the boxes with pressure water, so that the fronts of the screens are first cleaned by the water playing on same from the sparge boxes. The valves on the pipes 45 are now closed and the valves on the pipes 46 opened so that the backs of the screens are now cleaned by the water from the compartments 48. The fronts and the backs of the screens are cleaned alternately by playing the pressure water on same or if desired both sides may be cleaned at the same time by opening the valves 55 on both pipes 45 and 46.

After the screens of the first series are cleaned the valves 62 are closed and the flexible connection to the pipe 61 is uncoupled, the motor 41 is actuated and the carriage moved over the second series of screens. The pipes 43 are now connected to the next connections of the pipe 61 by the flexible connections and coupling and the process of spraying is repeated and then the carriage is moved farther along until all the series of screens of the set are cleaned.

When the sparge boxes are lowered under the weight of the water in same they are guided into position by projecting plates or arms 65 which engage in grooves 66 formed in the walls 9 and when there are no division walls 9 between each series of the set of screens, the screens being supported by stanchions as previously mentioned, the sparge boxes 44 may be made long enough to clean all the screens of the set in the same row, that is, the screens which are in alinement with each other.

Scour pipes 67 fitted with valves 68 are arranged below the filtering chamber and the chambers 13 and 16 to lead away the waste washing water to where desired.

The air compressor 64, the pump 63 and other machinery, such as a dynamo 69 for lighting, power or other purposes, may be driven from a shaft 70 driven from a turbine 71 which may be actuated by the water in the inlet pipe 25 from the reservoir or lake which gives the water supply, or the shaft 70 may be driven by other means.

The supply of pressure water for filter cleaning purposes is obtained by means of the turbine 71 which actuates the pump or a combined centrifugal turbine and pump may be used to force water, after passing through the filters, from the pipe 26 through the pipe 72 to the pipe 61 and then through the flexible piping to the spray boxes to play on the screens.

If desired, the screens may be placed vertically at an angle or in some cases horizontally and instead of each screen being removable in some cases, for instance, when the appliances are used on a comparatively small scale each series of screens may be removable by being carried by the one frame and instead of arranging the series of screens side by side, as shown, the screens may either be arranged or formed in a circular, hexagonal, conical or other polygonal manner as found most suitable. This improved method and appliance can be adapted to filter and treat as well as water other liquids or semi-liquids.

As illustrated, this system of filtering water is preferably contained within a suitable building 73 having a portion 74 set apart for an office or the like.

Figures 10, 11:
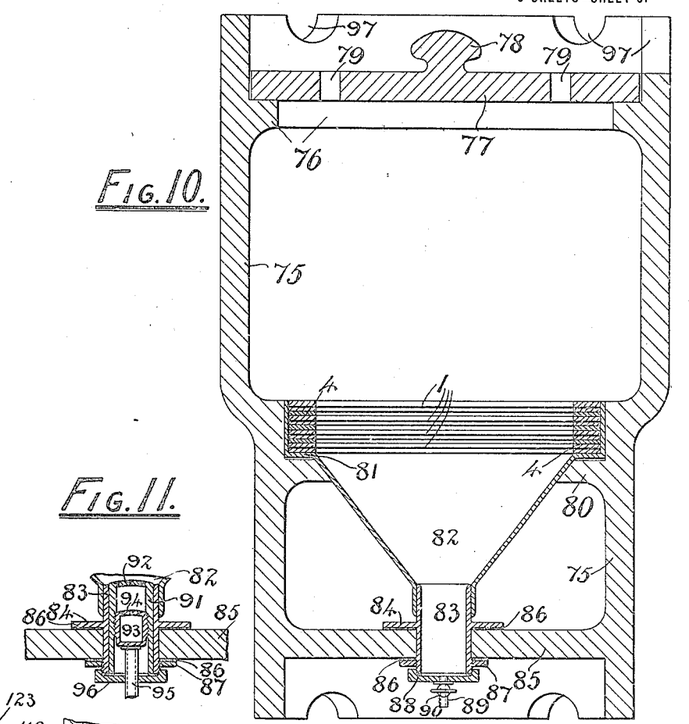
Fig. 10 is a sectional elevation of an arrangement or system of filtering appliances but illustrating the application of the invention to a small portable filter such as for use in a dwelling house.
Fig. 11 is a sectional elevation of the spray or sparge box for use in conjunction with said portable filter for cleaning the screens of same.
Figure 12:
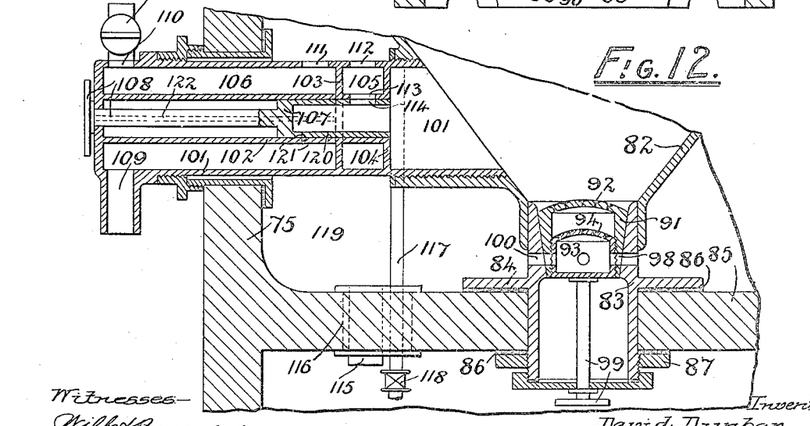
Fig. 12 is a sectional elevation (broken away) of a form of small portable filter but having a spray or sparge box arranged in same.

As illustrated by Figs. 10 to 12 this system of filtering water or the like may be used in small portable filters as well as in filters for a town's supply of water.

The portable filter may consist of a vessel 75 of suitable material, for instance, earthenware or porcelain formed with a shoulder 76 at its upper part on which rests a suitable lid or cover 77 formed with a handle 78 and holes 79. The vessel 75 is also formed with an internal ledge or shoulder 80 on which rests the filter screens 1 carried in a suitable housing frame 81 preferably having its lower portion 82 tapered or cone shape. The screens 1 may be carried in frames 4 fitted into the housing 81 and may be arranged in series or sets. As illustrated, the frames 1 are preferably arranged in one set consisting of a series of four screens.

A tube 83 formed with a flange 84 is fitted into the lower tapered end 82 of housing 81 and through the bottom plate 85 of the vessel 75. Packing material 86 is arranged between the flange 84 and plate 85 and between the plate 85 and a washer 87 screwing on the end of tube 83. A cover plate 88 fitted with a nozzle 89 and cock 90 is also screwed on the end of the tube 83.

The water to be filtered is introduced into the vessel 75 above the screens 1 and is filtered by passing through the screens. The filtered water collects in the tapered end 82 of housing 81 and is drawn away as required through the nozzle 89 when the cock 90 is opened.

When the screens become choked and it is desired to clean same, the cover 77 is removed, the vessel 75 inverted and then the cover 88 is removed. A short tube 91 (Fig. 11) formed with a perforated end 92 and fitted with a chamber 93 having a similarly perforated end 94 and a tube 95 is now inserted in the tube 83 on the end of which a cover plate 96 is screwed.

A mixture of water and air or other suitable cleansing fluid is now forced through the tube 95 by means of a suitable pump into the chamber 93 and then through the perforations in the end of same into the space between the two perforated ends 92 and 94. The cleansing fluid issues from the perforations in the end 92 in the form of a spray and impinges on the screens 1 and in passing through the screens in the opposite direction to the flow of the water when being filtered cleanses the screens. The water after washing the screens passes out from the vessel 75 through the openings 97 into a suitable receptacle.

As illustrated by Fig. 12 the tube 91 is permanently arranged in the tube 83 in the form of a tapered cock and ports or holes 98 are formed through the sides of same into the chamber 93 which is fitted with a rod and disk handle 99. Ports or holes 100 are also formed in the tube 83.

A tube 101 is fitted into the tapered part 82 and extends outward through the side of the vessel 75. This tube 101 is formed or fitted with an inner concentric tube 102 and division plates 103 and 104 so that chambers 105 and 106 are formed. The interior of the tube 102 is fitted with a cock 107 having a rod and disk handle 108. The tube 101 is fitted outside the vessel 75 with a nozzle 109 and is formed with a port 110 and inside the vessel 75 with ports 111 and 112, while the tube 102 is formed with a port 113 which communicates with the chamber 105 and with a port 114 formed in the cock 107. A partition 122 divides chamber 106 into upper and lower compartments and a tap 123 is arranged on the port 110.

A relief valve 115 is fitted into a bush 116 which also carries a pipe 117 fitted with a valve 118.

Marks, such as arrows with suitable lettering may be made on the end of tube 101 behind the disk handle 108 so as to show the position of the cock 107.

The water after being filtered by passing through the screens 1 fills the tapered part 82 and flowing through the cock 107, ports 114 and 113, chamber 105 and port 112 into the chamber or interior 119 of vessel 75.

When the water in chamber 119 reaches the level of the port 111 it flows through same into the upper compartment of chamber 106 and escapes outside the apparatus through the port 110 and tap 123.

The handle 108 is now turned so as to cut off the port 114 from the port 113 and the handle 99 is also turned so as to cut off the ports 100 from the ports 98.

When a supply of filtered water is required the handle 108 is given a further turn so as to bring a port 120 in cock 107 opposite a port 121 in tube 102. The filtered water now passes from the tapered part 82 through the cock 107, ports 120, 121, into the lower compartment of chamber 106 and from thence through the nozzle 109.

While the chamber 119 is filling, the air in same escapes through the ports 111 and 110.

When the screens are to be cleaned the ports 98 and 100 are put into communication with each other by turning the handle 99, the vessel 75 is inverted and the mixture of filtered water and air in chamber 119 is forced through the perforated ends 92 on to the screens by forcing air or other fluid through the pipe 117 by any suitable apparatus.

What I claim and desire to secure by Letters Patent is:—

1. In apparatus for filtering water and the like, the combination of an elongated filter chamber; a series of openwork screens dividing said chamber into compartments; a carriage movable over said chamber; means supported by said carriage for directing cleansing fluid onto said screens, the same consisting of an elongated spray box; counter-weights connected to said box to permit of its movement adjacent the screens; and means for supplying cleansing fluid to said spray box.

2. In apparatus for filtering water and the like, the combination of a series of parallel filter chambers; openwork screens dividing said chambers into a series of compartments; a carriage movable over said chambers; a spray box or boxes mounted on the carriage; means supporting said spray boxes to permit of their movement adjacent the screens; and means for supplying cleansing fluid to said spray box or boxes.

In testimony whereof, I have signed my name to this specification, in the presence of two subscribing witnesses.

DAVID DUNBAR.

Witnesses:
 JOHN STEWART,
 JOHN SIME.

Copies of this patent may be obtained for five cents each, by addressing the "Commissioner of Patents, Washington, D. C."